Figure 1B:
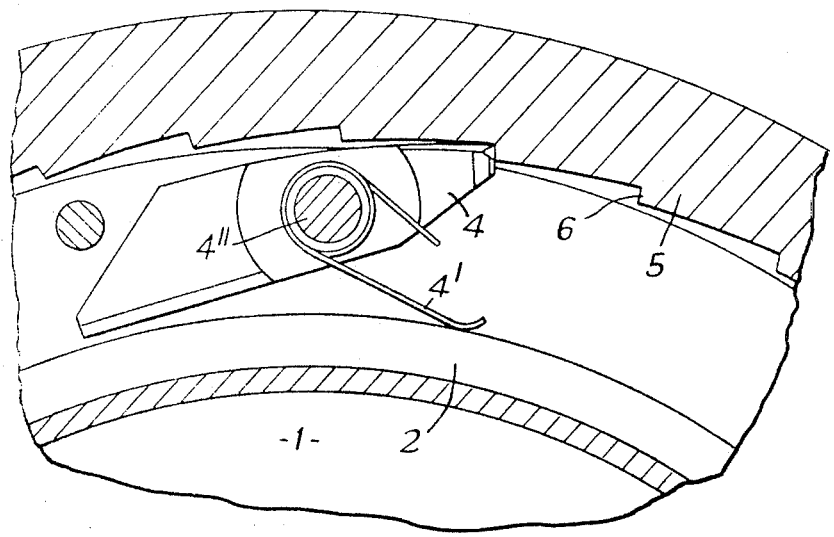

Sept. 20, 1966  H. A. CLEMENTS  3,273,412
SYNCHRONOUS SELF-SHIFTING GEAR MECHANISM
Filed Feb. 23, 1965  2 Sheets-Sheet 1
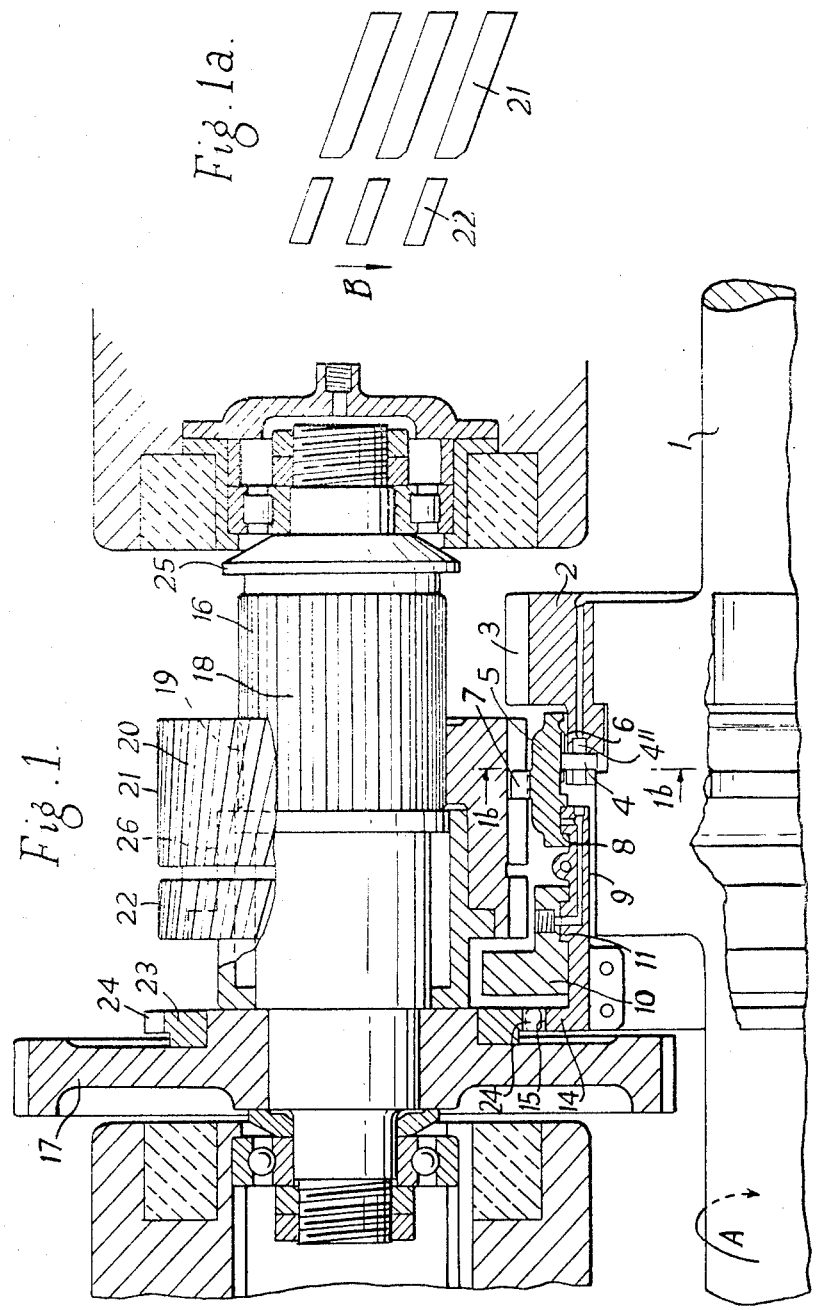
INVENTOR
HERBERT ARTHUR CLEMENTS
BY
his ATTORNEYS United States Patent Office 3,273,412
Patented Sept. 20, 1966

3,273,412
SYNCHRONOUS SELF-SHIFTING GEAR MECHANISM
Herbert Arthur Clements, Weybridge, England, assignor to S.S.S. Patents Limited, London, England, a British company
Filed Feb. 23, 1965, Ser. No. 434,523
7 Claims. (Cl. 74—339)

This invention relates to synchronous self-shifting gear mechanism for drivably engaging and disengaging rotary gear clutch members.

A well known type of synchronous self-shifting clutch mechanism comprises a first rotary clutch member provided with a first set of clutch teeth, a second rotary clutch member, an intermediate member provided with a second set of clutch teeth and constrained for helical movement relative to the second clutch member to bring the second set of clutch teeth into and out of engagement with the first set of clutch teeth, and pawl and ratchet mechanism for initiating precise interengagement of the sets of clutch teeth upon relative angular movement in one direction between the first and second clutch members. During the movement of the clutch towards engagement there is relative axial sliding movement between the actuating pawls and the coacting ratchet teeth, and following the initiation of clutch engagement the pawls and ratchet teeth disengage axially, thereby becoming relieved of the actuating load.

An object of the invention is to provide a gear mechanism of the synchro self-shifting type wherein the first and second gear members are on parallel axes of rotation, whereas heretofore such mechanisms have only been suitable for a coaxial arrangement of the first and second members.

In accordance with the present invention there is provided synchronous self-shifting gear mechanism for drivably engaging and disengaging first and second sets of gear teeth, the mechanism comprising a first rotary gear member provided with said first set of gear teeth, a second rotary gear member with its axis parallel to that of the first gear member, an intermediate member provided with said second set of gear teeth and constrained for movement relative to said second gear member to bring said second set of gear teeth into and out of engagement with said first set of gear teeth, pawl and ratchet mechanism for actuating said intermediate member to initiate precise interengagement of the said sets of gear teeth, and a rotary actuating ring axially located relative to said first gear member and having teeth engageable with the teeth of said intermediate member, said pawl and ratchet mechanism being arranged between said actuating ring and said first gear member whereby upon movement of said intermediate member to interengage, at least partially, said first and second sets of gear teeth the pawls are relieved of load by the axial disengagement of the teeth of said driving connection without the need for relative axial disengaging movement between the pawls and the ratchet teeth, the teeth of said intermediate member, first gear member and actuating ring being helical and said intermediate member being constrained for axial movement relative to said second gear member.

An embodiment of the invention will now be described by way of example with reference to the accompanying drawing, in which FIG. 1 is a view in longitudinal section of gear mechanism according to the invention, applied to the establishment and interruption of drive from a barring motor through toothed gearing to a turbine shaft, FIG. 1a is a development view of main and auxiliary clutch teeth of the gear mechanism of FIG. 1, and FIG. 1b is a part detail view, on a larger scale than FIG. 1, on the line I—I of FIG. 1.

Referring to the drawing, a turbine shaft 1 carries a ring 2 which forms the above-mentioned first rotary gear member, the ring 2 being formed with a first set of gear teeth constituted by external helical gear teeth 3 and carrying a plurality of pawls one of which is shown at 4 mounted on a pawl pin 4". The noses of the pawls 4 project radially outwardly from the axis of the turbine shaft 1, and point in clockwise direction as viewed from the left hand end of the mechanism, the pawls 4 being provided with control springs 4' (FIG. 1b) tending to urge the noses of the pawls radially outwardly. Around the turbine shaft 1 is arranged an actuating ring 5 formed with internal ratchet teeth 6, adapted to coact with the pawls 4, as shown in part end view in FIG. 1b, and with a ring of external helical gear teeth 7. The actuating ring 5 is mounted via a plain white metalled bearing on an external annular flange 8 on one end of an annular support member 9, surrounding the turbine shaft 1, the flange 8 projecting into an internal annular groove in the actuating ring 5. The support member 9 is journalled on a static ring 10, via a white metalled bearing comprising an external annular flange 11 formed on the support member 9 and projecting into an internal annular groove in the static ring 10, which is bolted to a stationary casing (not shown), that encloses the gear mechanism. The support member 9 has a radially outwardly projecting annular flange 14 formed with a ring of external gear teeth 15.

An auxiliary shaft 16, forming the above-mentioned second rotary gear member, is journalled with its axis parallel to that of the turbine shaft 1, and is drivably connected to a conventional high speed barring motor (not shown) through spur reduction gearing including a gear wheel 17. The shaft 16 is formed with axial splines 18 with which are engaged internal axial splines 19 in an intermediate member formed by a gear sleeve 20 mounted on shaft 16, the gear sleeve 20 being formed with a second set gear teeth constituted by a ring of main helical gear teeth 21 of normal circumferential thickness, the gear sleeve 20 also being formed with a ring of auxiliary helical gear teeth 22 which are of smaller circumferential thickness than the main gear teeth 21 and are each aligned, in respect of one side, with a main gear tooth 21, as shown in the development view, FIG. 1a. To the gear wheel 17 is bolted a ring 23 formed with external gear teeth 24 on a larger pitch circle diameter than the gear teeth 21 and 22, the gear teeth 24 engaging with the gear teeth 15 on the support member 9.

The operation is as follows:

With the turbine shaft 1 rotating at high speed in the direction of the arrow A the barring motor is normally switched off, hence the auxiliary shaft 16, the gear sleeve 20, the actuating ring 5 and its support member 9 are stationary. Under these conditions the gear sleeve 20 is out of toothed engagement with the ring 2 on the turbine shaft 1, being in the position shown in the drawing, and the gear teeth 7 on the actuating ring 5 are in mesh, as shown, with the main gear teeth 21 on the gear sleeve 20. The pawls 4 move at high speed relative to the ratchet teeth 6, and since the pawls 4 are made tail heavy relative to their pins 4' their noses are retracted by centrifugal force out of contact with the ratchet teeth 6. Below a predetermined angular speed of the turbine shaft 1, viz. a relatively low speed as compared with the full turbine speed, the centrifugal force acting to retract the noses of the pawls 4 from the ratchet teeth 6 is overcome by the action of the pawl control springs, whereby to bring the pawls into over-running contact with the ratchet teeth 6 at the low speed of the shaft 1.

When the turbine set is to be stopped, the barring motor is switched on while the speed of the turbine is decreasing shortly after the motive power of the turbine has been cut off, and the barring motor, acting through the reduction gearing, rotates the shaft 16 and toothed ring 23 slowly in the direction of the arrow B, the toothed actuating ring 5 being driven slowly in the direction of arrow A by the interaction of the helical gear teeth 7 and 21, and the support member 9 also being driven slowly in the direction of arrow A, but at a slightly higher speed than the actuating ring 5, by the interaction of the gear teeth 15 and 24. At the above-mentioned relatively low angular speed of the turbine shaft 1 the control springs of the pawls 4 overcome the action of centrifugal force and urge the noses of the pawls into ratcheting engagement with the ratchet teeth 6. When the speed of the turbine shaft 1 falls fractionally below that of the actuating ring 5, pawls 4 engage ratchet teeth 6, so that the interaction of the helical gear teeth 7 and 21 creates a reactive force that causes the gear sleeve 20 to shift axially along the auxiliary shaft 16 to bring its main helical gear teeth 21 into precise initial interengagement with the helical gear teeth 3. The coaction of the gear teeth 21 and 3 then causes the gear sleeve 20 to move into full geared engagement with the gear teeth 3, the gear sleeve 20 then being against a stop 25. A gear driving connection is thereby established between the barring motor and the turbine shaft 1, via the reduction gear wheel 17, auxiliary shaft 16, and helical gear teeth 21 and 3, so that the turbine shaft 1 is rotated at a substantially constant low speed determined by the speed of the barring motor and the ratio of the reduction gear train comprising the gear wheel 17 and helical teeth 21 and 3.

During the movement of the gear sleeve 20 from initial to full interengagement of the main gear teeth 21 and gear teeth 3 the main gear teeth 21 move axially out of engagement with the gear teeth 7 on the actuating ring 5, thereby relieving the pawls 4 from the actuating force, and the auxiliary gear teeth 22 enter into mesh with the gear teeth 7; hence the actuating ring 5 continues to be rotated.

Since the actuating ring 5 carrying the ratchet teeth 6 is axially located at 8 relative to the first gear member 1 carrying the pawls 4, movement of the gear from the disengaged condition to the engaged condition does not cause any relative axial movement of the pawls 4 and ratchet teeth 6.

When the turbine shaft 1 is again accelerated, the interaction of the main gear teeth 21 and the gear teeth 3 shifts the gear sleeve 20 axially along the auxiliary shaft 16 out of geared engagement with the turbine shaft 1, and the main gear teeth 21 again interengage with the gear teeth 7 on the actuating ring 5, being chamfered as shown in FIG. 1a to effect a smooth transition from the narrow teeth 22 to the main teeth 21. Thereupon, the torque due to friction at the bearing at 8 between the rotating actuating ring 5 and its faster rotating support member 9, acting in conjunction with the helical splines 18 and 19, causes the actuating ring 5 to shift the gear sleeve 20 axially back to the position shown in FIG. 1, in which a sleeve 26 bolted to the gear sleeve 20 is against the side of the gear wheel 17, and in which the pawls 4 ratchet relative to the ratchet teeth 6 until the turbine shaft 1 attains the said predetermined speed, whereupon the noses of the pawls 4 are disengaged from the ratchet teeth 6 by centrifugal force. The barring motor is switched off at any convenient time after the turbine power has been restored.

If desired, the support member 9 on which the actuating ring 5 is journalled, may, instead of being geared to the barring motor for rotating by it, be fixed to a stationary support. The arrangement above described is preferred, however, since with a fixed support member for the actuating ring 5, upon the barring motor being switched on the friction at the bearing at 8 between the actuating ring 5 and its support member 9 could exert on the actuating ring 5 a reaction torque that could cause the gear sleeve 20 to move into nuzzling end to end contact of its teeth 21 with the teeth 3 on the ring 2, before the speed of the turbine shaft 1 has fallen to a value such that the pawls 4 and ratchet teeth 6 can interact to bring about precise initial interengagement of the gear teeth 21 and 3. It is therefore preferred that the support member 9 be arranged to be rotated in the same direction as the actuating ring 5 by the barring motor, at an angular speed not less than that of the actuating ring 5. The angular speeds of the support member 9 and actuating ring 5 may be arranged to be the same, by arranging the gear teeth 24 on the same pitch circle diameter as the gear teeth 21, in which case there will be no tendency for the gear sleeve 20 to shift into nuzzling contact as described above. Where the support member 9 is arranged to be driven at a slightly higher speed than the actuating ring 5, as described, the torque applied to the actuating ring 5 due to friction at its bearing at 8 is in the sense to restrain the gear sleeve 20 from shifting into nuzzling toothed contact.

I claim:
1. Synchronous self-shifting gear mechanism comprising a first rotary gear member, a first set of helical gear teeth carried by said first gear member, a second rotary gear member, means mounting said first and second gear members for rotation about parallel axes, an intermediate member, a second set of helical gear teeth carried by said intermediate member, means constraining said intermediate member for axial movement relative to said second gear member to bring said second set of gear teeth into and out of engagement with said first set of gear teeth, a rotary actuating ring member axially located relative to said first gear member, further helical teeth carried by said actuating ring member and engageable with said second set of gear teeth, pawl and ratchet mechanism for actuating said intermediate member to initiate precise interengagement of said first and second sets of gear teeth, said pawl and ratchet mechanism comprising ratchet teeth drivably connected to one of said actuating ring and first gear members and at least one pawl carried by the other of said actuating ring and first gear members.

2. Synchronous self-shifting gear mechanism comprising a first rotary gear member, a first set of helical gear teeth carried by said first gear member, a second rotary gear member, means mounting said first and second gear members for rotation about parallel axes, an intermediate member, a second set of helical gear teeth carried by said intermediate member, means constraining said intermediate member for axial movement relative to said second gear member to bring said second set of gear teeth into and out of engagement with said first set of gear teeth, a rotary actuating ring member axially located relative to said first gear member, further helical teeth carried by said actuating ring member and engageable with said second set of gear teeth, pawl and ratchet mechanism for actuating said intermediate member to initiate precise interengagement of said first and second sets of gear teeth, said pawl and ratchet mechanism comprising ratchet teeth drivably connected to one of said actuating ring and first gear members and at least one pawl carried by the other of said actuating ring and first gear members, said first and second sets of gear teeth and said further helical teeth having a mutual arrangement whereby said pawl is relieved of load by the axial disengagement of said further helical teeth and said second set of gear teeth upon movement of said intermediate member to engage, at least partially, said first and second sets of gear teeth.

3. Synchronous self-shifting gear mechanism comprising a first rotary gear member, a first set of helical gear teeth carried by said first gear member, a second rotary gear member, means mounting said first and second gear members for rotation about parallel axes, an intermediate member, a second set of helical gear teeth carried by said intermediate member, means constraining said intermediate member for axial movement relative to said second gear member to bring said second set of gear teeth into and out of engagement with said first set of gear teeth, a rotary actuating ring member axially located relative to said first gear member further helical teeth carried by said actuating ring member and engageable with said second set of gear teeth, pawl and ratchet mechanism for actuating said intermediate member to initiate precise interengagement of said first and second sets of gear teeth, said pawl and ratchet mechanism comprising ratchet teeth drivably connected to one of said actuating ring and first gear members and at least one pawl carried by the other of said actuating ring and first gear members, a support member supporting and rotatable relative to said actuating ring, and means drivably connecting said support member to said second rotary gear member to rotate said support member in the same direction as and faster than said actuating ring when said second rotary gear member rotates.

4. Synchronous self-shifting gear mechanism comprising a first rotary gear member, a first set of helical gear teeth carried by said first gear member, a second rotary gear member, means mounting said first and second gear members for rotation about parallel axes, an intermediate member, a second set of helical gear teeth carried by said intermediate member, means constraining said intermediate member for axial movement relative to said second gear member to bring second set of gear teeth into and out of engagement with said first set of gear teeth, a rotary actuating ring member axially located relative to said first gear member, further helical teeth carried by said actuating ring member and engageable with said second set of gear teeth, pawl and ratchet mechanism for actuating said intermediate member to initiate precise interengagement of said first and second sets of gear teeth, said pawl and ratchet mechanism comprising ratchet teeth drivably connected to one of said actuating ring and first gear members and at least one pawl carried by the other of said actuating ring and first gear members, said first and second sets of gear teeth and further helical teeth having a mutual arrangement whereby said pawl is relieved of load by the axial disengagement of said further helical teeth and said second set of gear teeth upon movement of said intermediate member to engage, at least partially, said first and second sets of gear teeth, a support member supporting and rotatable relative to said actuating ring, and means drivably connecting said support member to said second rotary gear member to rotate said support member in the same direction as and faster than said actuating ring when said second rotary gear member rotates.

5. Synchronous self-shifting gear mechanism comprising a first rotary gear member, a first set of helical gear teeth carried by said first gear member, a second rotary gear member, means mounting said first and second gear members for rotation about parallel axes, an intermediate member, a second set of helical gear teeth carried by said intermediate member, means constraining said intermediate member for axial movement relative to said second gear member to bring said second set of gear teeth into and out of engagement with said first set of gear teeth, a rotary actuating ring member axially located relative to said first gear member, further helical teeth carried by said actuating ring member and engageable with said second set of gear teeth, pawl and ratchet mechanism for actuating said intermediate member to initiate precise interengagement of said first and second sets of gear teeth, said pawl and ratchet mechanism comprising ratchet teeth drivably connected to one of said actuating ring and first gear members and at least one pawl carried by the other of said actuating ring and first gear members, a support member supporting and rotatable relative to said actuating ring, and means drivably connecting said support member to said second rotary gear member to rotate said support member in the same direction as and at substantially the same speed as said actuating ring when said second rotary gear member rotates.

6. Synchronous self-shifting gear mechanism comprising a first rotary gear member, a first set of helical gear teeth carried by said first gear member, a second rotary gear member, means mounting said first and second gear members for rotation about parallel axes, an intermediate member, a second set of helical gear teeth carried by said intermediate member, means constraiing said intermediate member for axial movement relative to said second gear member to bring second set of gear teeth into and out of engagement with said first set of gear teeth, a rotary actuating ring member axially located relative to said first gear member, further helical teeth carried by said actuating ring member and engageable with said second set of gear teeth, pawl and ratchet mechanism for actuating said intermediate member to initiate precise interengagement of said first and second sets of gear teeth, said pawl and ratchet mechanism comprising ratchet teeth drivably connected to one of said actuating ring and first gear members and at least one pawl carried by the other of said actuating ring and first gear members, said first and second sets of gear teeth and said further helical teeth having a mutual arrangement whereby said pawl is relieved of load by the axial disengagement of said further helical teeth and said second set of gear teeth upon movement of said intermediate member to engage, at least partially, said first and second sets of gear teeth, a support member supporting and rotatable relative to said actuating ring, and means drivably connecting said support member to said second rotary gear member to rotate said support member in the same direction as and at substantially the same speed as said actuating ring when said second rotary gear member rotates.

7. Synchronous self-shifting gear mechanism comprising a first rotary gear member, a first set of helical gear teeth carried by said first gear member, a second rotary gear member, means mounting said first and second gear members for rotation about parallel axes, an intermediate member, a second set of helical gear teeth carried by said intermediate member, means constraining said intermediate member for axial movement relative to said second gear member to bring said second set of gear teeth into and out of engagement with said first set of gear teeth, a rotary actuating ring member axially located relative to said first gear member, a fixed support member by which said actuaitng ring is supported and relative to which said actuating ring is rotatable, further helical teeth carried by said actuating ring member and engageable with said second set of gear teeth, pawl and ratchet mechanism for actuating said intermediate member to initiate precise interengagement of said first and second sets of gear teeth, said pawl and ratchet mechanism comprising ratchet teeth drivably connected to one of said actuating ring and first gear members and at least one pawl carried by the other of said actuating ring and first gear members.

No references cited.

DAVID J. WILLIAMOWSKY, *Primary Examiner.*

ARTHUR T. McKEON, *Examiner.*